(12) United States Patent
Nakajima et al.

(10) Patent No.: US 11,975,795 B2
(45) Date of Patent: May 7, 2024

(54) LEANING-TYPE VEHICLE

(71) Applicant: Kawasaki Motors, Ltd., Akashi (JP)

(72) Inventors: Takeshi Nakajima, Akashi (JP); Hiroshi Ishii, Akashi (JP); Taro Iwamoto, Akashi (JP); Kazuya Nagasaka, Akashi (JP); Taichi Inaba, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/757,988

(22) PCT Filed: Dec. 9, 2020

(86) PCT No.: PCT/JP2020/045868
§ 371 (c)(1),
(2) Date: Jun. 24, 2022

(87) PCT Pub. No.: WO2021/131708
PCT Pub. Date: Jul. 1, 2021

(65) Prior Publication Data
US 2023/0030243 A1 Feb. 2, 2023

(30) Foreign Application Priority Data
Dec. 26, 2019 (JP) ................. 2019-236742

(51) Int. Cl.
*B62K 5/10* (2013.01)
*B62K 5/027* (2013.01)
(Continued)

(52) U.S. Cl.
CPC ............... *B62K 5/10* (2013.01); *B62K 5/027* (2013.01); *B62K 5/05* (2013.01); *B62K 5/08* (2013.01); *B62K 21/12* (2013.01)

(58) Field of Classification Search
CPC . B62K 5/10; B62K 5/027; B62K 5/05; B62K 5/08; B62K 21/12
See application file for complete search history.

(56) References Cited

U.S. PATENT DOCUMENTS

| 4,634,137 A | 1/1987 | Cocksedge |
| 8,086,382 B2 | 12/2011 | Dagenais et al. |

(Continued)

FOREIGN PATENT DOCUMENTS

| CN | 201151444 | 11/2008 |
| CN | 106476958 | 3/2017 |

(Continued)

OTHER PUBLICATIONS

Berote et al., "Development of a Tilt Control Method for a Narrow-Track Three-Wheeled Vehicle"; Journal of Automobile Engineering Proceeding of the Institute of Mechanical Engineers, Part D, vol. 226, Issue 1, Jan. 2012, pp. 48-69.

(Continued)

*Primary Examiner* — Amy R Weisberg
*Assistant Examiner* — Shams Dhanani
(74) *Attorney, Agent, or Firm* — Fay Kaplun & Marcin, LLP

(57) ABSTRACT

A leaning vehicle includes a vehicle body, a plurality of wheels, a lean mechanism, and a lean stopper mechanism. The wheels include a left front wheel and a right front wheel. The lean mechanism causes the left front wheel and the right front wheel to lean about a front-rear direction as a rotation center when the vehicle body leans about the front-rear direction as a rotation center. The lean stopper mechanism prevents a lean angle from exceeding a limit angle. in a plan view, an area bounded by lines connecting contact positions of ground and tires of the plurality of wheels is referred to as a grounding surface inner area, and a gravity center is (Continued)

positioned in the grounding surface inner area in a state where the lean angle reaches the limit angle.

18 Claims, 11 Drawing Sheets

(51) Int. Cl.
    *B62K 5/05*     (2013.01)
    *B62K 5/08*     (2006.01)
    *B62K 21/12*     (2006.01)

(56) References Cited

U.S. PATENT DOCUMENTS

| | | | |
|---|---|---|---|
| 9,216,790 B2* | 12/2015 | Takano | B62K 5/08 |
| 2005/0167174 A1 | 8/2005 | Marcacci | |
| 2023/0052127 A1* | 2/2023 | Kashiwai | B62K 5/05 |

FOREIGN PATENT DOCUMENTS

| | | |
|---|---|---|
| CN | 206307218 | 7/2017 |
| CN | 206781973 | 12/2017 |
| CN | 108116577 | 6/2018 |
| DE | 102011106474 | 12/2011 |
| JP | 406171569 | 6/1994 |
| JP | 2008-505797 | 2/2008 |
| JP | 2011042223 | 3/2011 |
| JP | 2013-022993 | 2/2013 |
| JP | 2018-83568 | 5/2018 |
| JP | 2019001200 | 1/2019 |

OTHER PUBLICATIONS

Sponziello et al., "Stability Analysis of a Three-Wheeled Motorcycle"; SAE International Journal of Engines, Issue 1, vol. 1, Sep. 9, 2008, pp. 1396-1401.

* cited by examiner

LEANING-TYPE VEHICLE

PRIORITY DATA

The present application is a 371 application of PCT Patent Application Serial No. PCT/JP2020/0045868 filed on Dec. 9, 2020 which claims priority to Japanese Patent Application Serial No. 2019-236742 filed on Dec. 26, 2019. The disclosure of the above applications is incorporated herein by reference.

TECHNICAL FIELD

The present invention relates mainly to a leaning vehicle configured to lean a vehicle body when turning, for example.

BACKGROUND ART

Patent Literature 1 (PTL 1) discloses a three-wheeled vehicle including two front wheels and one rear wheel. The vehicle perform electronically control for preventing the wheels from rolling over. Specifically, the vehicle judges a state of the wheels based on an acceleration sensor's detection value and a tire grip threshold, and prevents rollover by, for example, actuating a brakes before the wheels lift off the ground.

CITATION LIST

Patent Literature

PTL 1: Specification of U.S. Pat. No. 8,086,382

SUMMARY OF INVENTION

A leaning vehicle turns by leaning a vehicle body, and the vehicle body may lean significantly depending on vehicle speed during the turn. However, some people may feel psychological resistance to lean the vehicle body significantly for a driver who is not used to drive a leaning vehicle. In this regard, PTL 1 disclose that an acceleration sensor need to be installed in order to prevent rollover and grasp a grip threshold of a tire, and then processes are complicated. The control for preventing rollover is not activated in a situation where the vehicle body leans significantly but the possibility of rollover is low, therefore the psychological resistance of leaning of the leaning vehicle may not be reduced.

The present invention relates to a leaning vehicle in which falling down is less likely to occur and psychological resistance of leaning a vehicle body can be reduced.

An aspect of the present invention provides a leaning vehicle having the following configuration. The leaning vehicle includes a vehicle body, a plurality of wheels, a lean mechanism, and a lean stopper mechanism. Wheels include a first front wheel and a second front wheel. The lean mechanism causes the first front wheel and the second front wheel to lean about a front-rear direction as a rotation center when the vehicle body leans about the front-rear direction as a rotation center. The lean stopper mechanism includes a stopper moving in response to a leaning operation by the lean mechanism and prevents a lean angle from exceeding a limit angle by bringing the stopper into contact with other member when the lean angle reaches the limit angle. In a plan view, an area bounded by lines connecting contact positions of ground and tires of the plurality of wheels is referred to as a grounding surface inner area, and a vehicle gravity center is positioned in the grounding surface inner area in a state where the lean angle reaches the limit angle.

Accordingly, since the leaning vehicle remains the self-standing in the limit angle, the leaning vehicle is less likely to fall down. Moreover, the psychological resistance of leaning the leaning vehicle for the driver who is not used to drive a leaning vehicle can be reduced.

Advantageous Effects of Invention

Some of advantages of the present invention are that in a leaning vehicle in which falling down is less likely to occur and psychological resistance of leaning a vehicle body can be reduced.

DETAILED DESCRIPTION

Description of Embodiments

Hereinafter, embodiments of the present invention will be described with reference to the drawings. In the description below, a left-right direction of a leaning vehicle 1 is defined based on a direction in which a driver riding on the leaning vehicle 1 faces. While the leaning vehicle 1 is upright, therefore, a front-rear direction is coincident with a vehicle length direction, and the left-right direction is coincident with a vehicle width direction. An up-down direction or an upper-lower direction (vertical direction) is coincident with a height direction.

In the description below, the wording of A being attached to (supported by) B should be interpreted as showing not only a configuration in which A is directly attached to (supported by) B but also a configuration in which A is attached to (supported by) B with interposition of another member. The wording of A overlapping the center in the vehicle width direction means that an imaginary line passing through the center of the leaning vehicle in the vehicle width direction overlaps A in a plan view or a front view, for example. The term "front portion" means a frontmost portion from among two or three portions into which the whole is divided in the front-rear direction (the same applies to a rear portion, etc.). Any description about the position of a member is based on a state where the leaning vehicle 1 is upright, a state where a steering angle is neutral, and a state where no load is applied except the dead load, unless otherwise noted.

Figure 1:
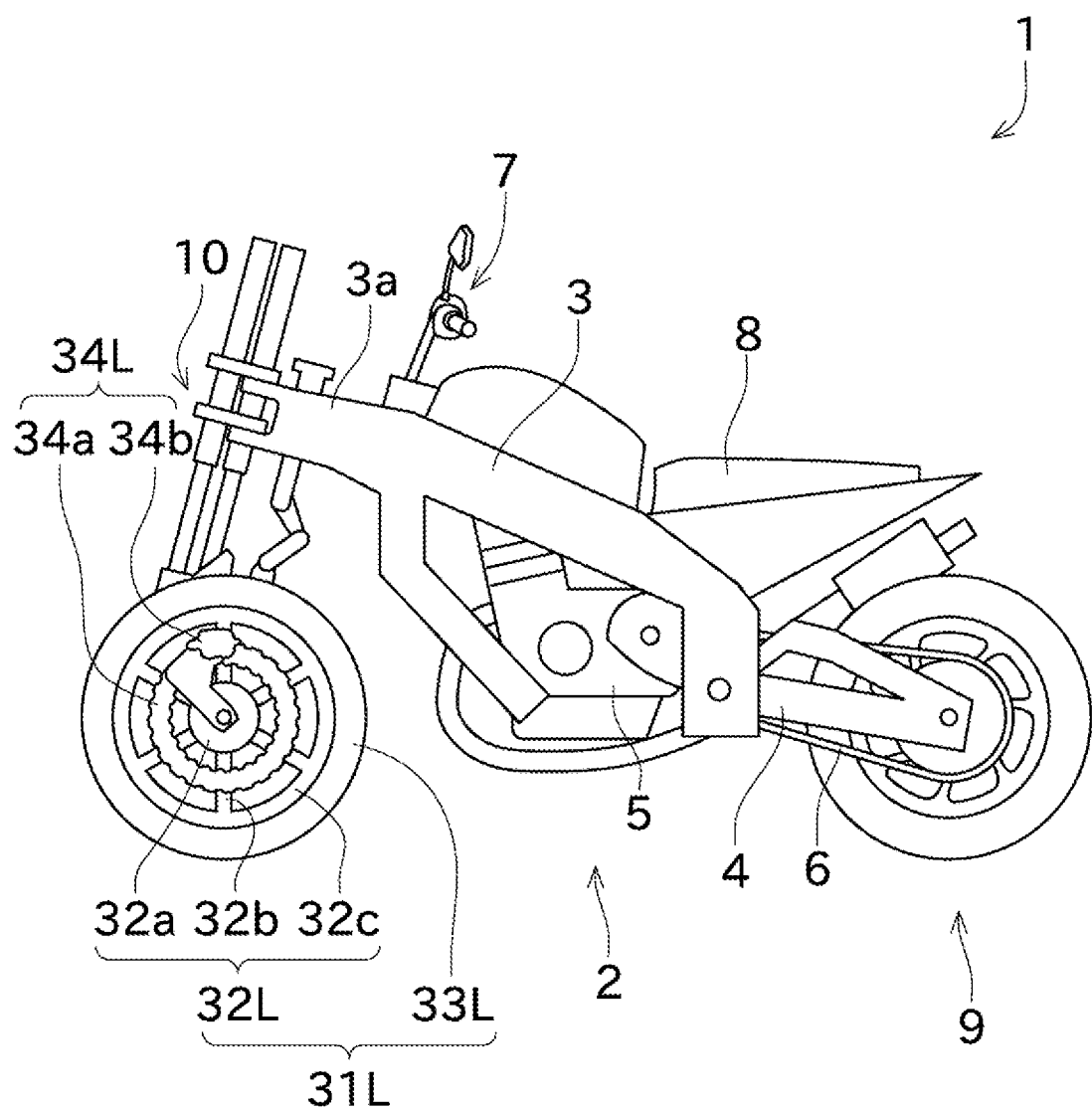
FIG. 1 shows a side view of a leaning vehicle according to a first embodiment of the present invention.
Figure 2:
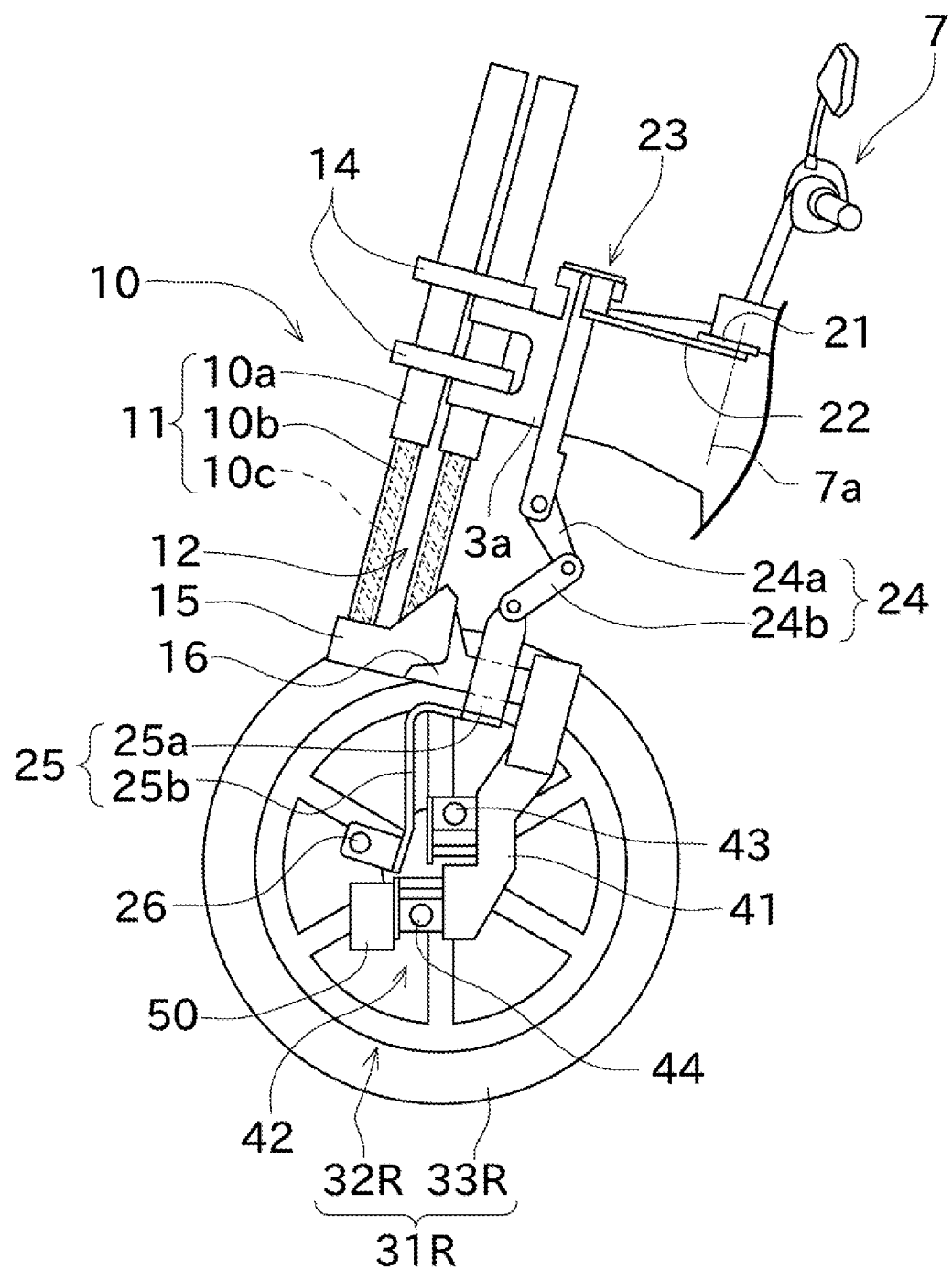
FIG. 2 shows a side view of a front portion of the leaning vehicle.

First, referring to FIG. 1 and FIG. 2, outline of the leaning vehicle 1 will be described.

The leaning vehicle 1 includes a vehicle body 2, a left front wheel (first front wheel) 31L, a right front wheel (second front wheel) 31R, and a rear wheel 9. The vehicle body 2 includes a vehicle body frame 3, which constitutes a framework of the leaning vehicle 1. The vehicle body frame 3 is composed of two or more frame elements coupled with a bolt or by welding, for example.

The left front wheel 31L is disposed on the left side (first side) relative to the center in the vehicle width direction. The right front wheel 31R is disposed on the right side (second side) relative to the center in the vehicle width direction. The left front wheel 31L and the right front wheel 31R are attached to the vehicle body frame 3. Details of how the left front wheel 31L and the right front wheel 31R are attached will be given later.

The rear wheel 9 is disposed at the center in the vehicle width direction. A swing arm 4 attached to a rear portion of the vehicle body frame 3 is capable of swinging up and down relative to the vehicle body frame 3. The rear wheel 9 is attached to the swing arm 4.

An engine 5 is attached to the vehicle body frame 3. The engine 5 is a drive source for making the leaning vehicle 1 travel. Power generated by the engine 5 is transmitted to the rear wheel 9 via a drive chain 6. In this manner, the leaning vehicle 1 can be made travel. Instead of or in addition to the engine 5, another drive source such as an electric motor for traveling may be provided. Alternatively, the engine 5 may be replaced with, for example, a pedal that allows the driver to apply power for traveling.

Attached to the vehicle body frame 3 is a steering handle 7 in the shape of a handlebar. In response to the driver applying a rotational steering force to the steering handle 7, the rotational steering force is transmitted to the left front wheel 31L and the right front wheel 31R via a later-described mechanism and a steering rod 26. This can consequently change an advancing direction of the leaning vehicle 1. Hereinafter, a change of the advancing direction of the leaning vehicle 1 may sometimes be referred to as a turn of the leaning vehicle 1. The later-described lean mechanism causes the leaning vehicle 1, when turning, to lean toward the center of the turning relative to a road surface. The steering handle 7 is not limited to a handlebar type one, and may be a steering wheel.

A seat 8 for the driver to sit thereon is disposed rearward of the steering handle 7. Steps (not shown) are disposed on a left side surface and a right side surface of the vehicle body 2, respectively. The driver straddling the seat 8 places his/her feet on the left and right steps. The leaning vehicle 1 is a vehicle (straddle vehicle) of a type having the seat 8 on which the driver sits astride.

Figure 3:
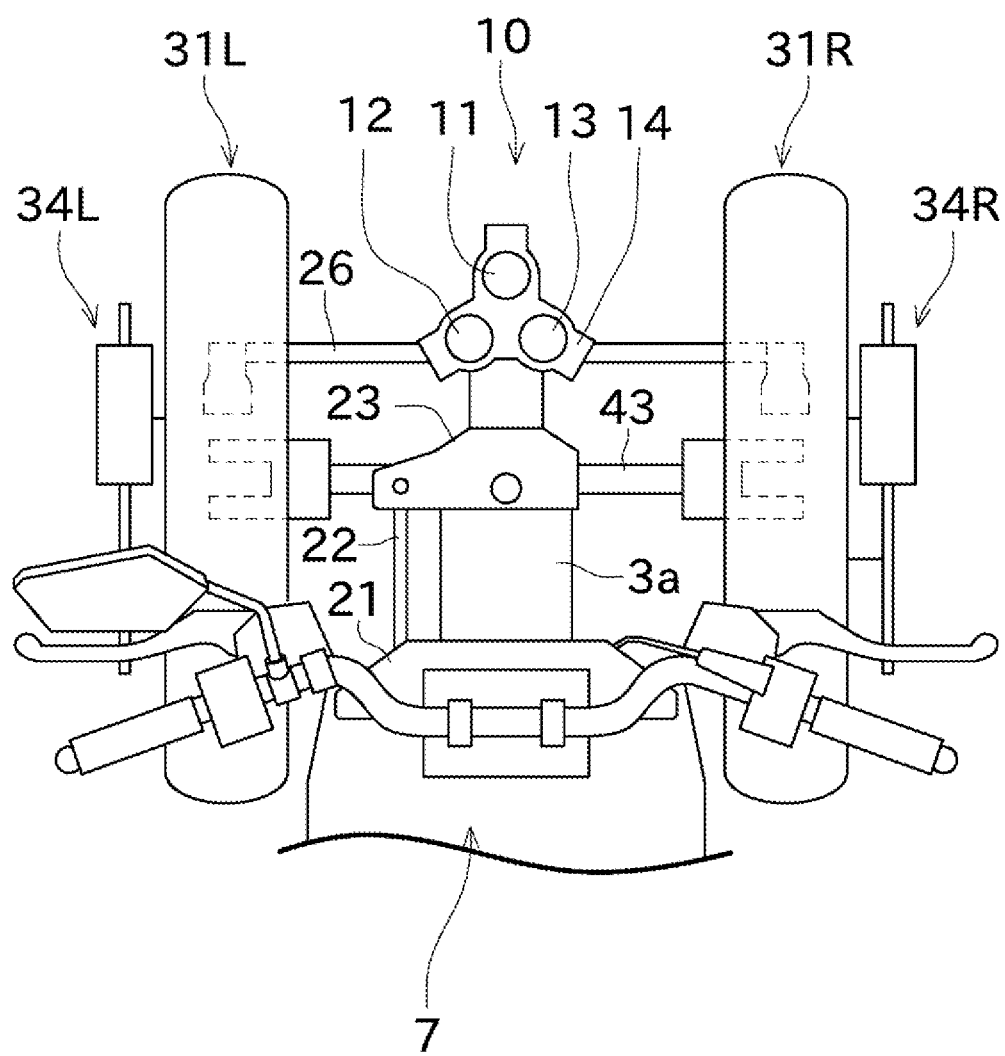
FIG. 3 shows a plan view of the front portion of the leaning vehicle.

A front suspension 10 included in the leaning vehicle 1 will now be described with reference to FIG. 2 and FIG. 3.

The suspension 10 couples the vehicle body 2 to the left front wheel 31L and the right front wheel 31R. The suspension 10 reduces vibrations that are transmitted to the vehicle body 2 in order that vibrations of the left front wheel 31L and the right front wheel 31R caused by, for example, unevenness of the road surface cannot be directly transmitted to the vehicle body 2. In the description below, a member attached on the side close to the left front wheel 31L and the right front wheel 31R (the side where vibrations occur) relative to the suspension 10 will be referred to as "vibration side member". A member attached on the side close to the vehicle body 2 (the side where vibration damping is made) relative to the suspension 10 will be referred to as "vibration-damping side member".

The suspension 10 includes a first tubular suspension 11, a second tubular suspension 12, and a third tubular suspension 13. In the following, the first tubular suspension 11, the second tubular suspension 12, and the third tubular suspension 13 will be collectively called "tubular suspensions 11, 12, and 13". The tubular suspensions 11, 12, and 13 have the same configuration. The configurations of the tubular suspensions 11, 12, and 13 are identical to the configuration of a front fork that is generally adopted in a motorcycle. The suspension 10 is not limited to a front fork type.

Each of the tubular suspensions 11, 12, and 13 includes a tubular body 10a, a sliding body 10b, and a spring 10c.

The tubular body (outer tube) 10a is an elongated tubular member. The tubular body 10a has the sliding body (inner tube) 10b received therein. The sliding body 10b is an elongated tubular member having a diameter smaller than that of the tubular body 10a. The sliding body 10b is capable of moving along its longitudinal direction relative to the tubular body 10a. The sliding body 10b has the spring 10c received therein. The tubular body 10a and the sliding body 10b are connected via the spring 10c. With this configuration, vibrations transmitted from the sliding body 10b to the tubular body 10a can be reduced. Oil is encapsulated in the suspension 10, and a movement of the sliding body 10b relative to the tubular body 10a causes a movement of the oil. The movement of the oil produces a resistance force (damping force), which can damp the vibrations in a short time.

In this embodiment, the tubular body 10a is disposed more upward than the sliding body 10b, and basically, the above-mentioned "vibration-damping side member" vibrates integrally with the tubular body 10a. The sliding body 10b is disposed more downward than the tubular body 10a. Basically, the above-mentioned "vibration side member" vibrates integrally with the sliding body 10b. Which one of the tubular body 10a and the sliding body 10b is disposed more upward or more downward than the other may be reversed.

The respective sliding bodies 10b of the tubular suspensions 11, 12, and 13 are configured to slide integrally. To be specific, the suspension 10 includes an upper coupling member 14 and a lower coupling member 15.

The upper coupling member 14 couples the respective tubular bodies 10a of the tubular suspensions 11, 12, and 13. This makes it impossible for the respective tubular bodies 10a of the tubular suspensions 11, 12, and 13 to move relative to one another, and thus the tubular bodies 10a can be integrated. At least one of the tubular bodies 10a of the tubular suspensions 11, 12, and 13 is attached to a front frame 3a disposed in a front portion of the vehicle body frame 3.

The lower coupling member 15 couples the respective sliding bodies 10b of the tubular suspensions 11, 12, and 13. This makes it impossible for the respective sliding bodies 10b of the tubular suspensions 11, 12, and 13 to move relative to one another, and thus allows the sliding bodies 10b to slide integrally. At least one of the sliding bodies 10b of the tubular suspensions 11, 12, and 13 is attached to a lower coupling base 16. The left front wheel 31L and the right front wheel 31R are attached to the lower coupling base 16 via the later-described mechanism.

Outline of the front wheel will now be described with reference to FIG. 1 and FIG. 2.

The left front wheel 31L and the right front wheel 31R are bilaterally symmetrical with respect to the center in the vehicle width direction. In the following, therefore, only the left front wheel 31L will be described, and a description about the right front wheel 31R (a right wheel 32R and a right tire 33R), a right brake 34R, and the like, will be omitted.

The left front wheel 31L includes a left wheel 32L and a left tire 33L. A left brake (front wheel brake mechanism) 34L is attached more outward than the left wheel 32L in the vehicle width direction. The left brake 34L applies braking to the left front wheel 31L by inserting a brake disc 34a, which is attached to the left wheel 32L, into a brake caliper 34b. It may be also acceptable that the left brake 34L is attached more inner side than the left wheel 32L in the vehicle width direction.

The left wheel 32L includes a hub 32a, a spoke 32b, and a rim 32c. The hub 32a has a hub hole in which an axle is received. The spoke 32b is shaped to extend outward from the hub 32a in a radial manner. The rim 32c is connected to the radially outer side of the spoke 32b, and the left tire 33L is attached to the rim 32c.

Attached to the left wheel 32L is a left arm 45 as a left knuckle member. An outer end portion of the above-mentioned steering rod 26 in the vehicle width direction is rotatably attached to the left arm 45. The steering rod 26 transmits a steering force to the left front wheel 31L via the left arm 45. The left arm 45 also constitutes a part of a lean mechanism which will be described later. That is, the left arm 45 of this embodiment is a part in which a knuckle member for changing an actual steering angle and a member for leaning the leaning vehicle 1 are unified.

A mechanism for transmitting a rotational steering force applied by the driver will now be described with reference to FIG. 2 and FIG. 3.

Disposed below the steering handle 7 is a rear bracket 21. The steering handle 7 and the rear bracket 21 are coupled by a fixture, for example. The steering handle 7 and the rear bracket 21 are integrally rotatable about a steering rotation axis 7a (a line substantially parallel to the upper-lower direction). A rotation angle of the steering handle 7 about the steering rotation axis 7a may sometimes be referred to as maneuvering angle.

The rear end of a transmission arm (rotation transmission part) 22 is rotatably attached to the rear bracket 21. The transmission arm 22 connects the rear bracket 21 to a first steering part 23. The transmission arm 22 transmits a rotational steering force applied to the steering handle 7 to the first steering part 23.

The first steering part 23 is disposed more frontward than the rear bracket 21 and the steering handle 7. The first steering part 23 is disposed so as to overlap the center in the vehicle width direction. Attached to the first steering part 23 is the front end of the transmission arm 22. This configuration allows the first steering part 23 to rotate as the steering handle 7 and the rear bracket 21 rotate.

Attached to the first steering part 23 is a pantograph mechanism 24. The pantograph mechanism 24 is positioned so as to overlap the center in the vehicle width direction. The pantograph mechanism 24 includes a first link portion 24a and a second link portion 24b. The first link portion 24a is attached to the first steering part 23 so as to be rotatable about the vehicle width direction. The second link portion 24b is attached to a later-described second steering part 25 so as to be rotatable about the vehicle width direction. The second steering part 25 is a "vibration side member". The first link portion 24a and the second link portion 24b are coupled to each other so as to be rotatable about the vehicle width direction.

With the configuration described above, the first steering part 23 and the second steering part 25 can be kept coupled even if a relative distance between the first steering part 23 and the second steering part 25 is changed. Accordingly, transmission of the rotational steering force remains enabled even though the suspension 10 expands or retracts because of, for example, unevenness of the road surface.

The second steering part 25 is positioned so as to overlap the center in the vehicle width direction. The second steering part 25 transmits a rotational steering force received via the pantograph mechanism 24 to the steering rod 26. The second steering part 25 includes a suspension attaching portion 25a and a rod attaching portion 25b.

The suspension attaching portion 25a is attached to the pantograph mechanism 24 (more specifically, to the second link portion 24b). The suspension attaching portion 25a is attached to the lower coupling base 16, too. The second steering part 25 rotates in accordance with steering, while the lower coupling base 16 does not rotate in accordance with steering. Accordingly, the second steering part 25 is attached so as to be rotatable relative to the lower coupling base 16.

The rod attaching portion 25b is attached to a lower portion of the suspension attaching portion 25a. The rod attaching portion 25b has a substantially L-like shape including a portion that extends frontward from the suspension attaching portion 25a and a portion that extends downward. With this configuration, a space can be formed below the suspension attaching portion 25a. In this space, a part of the later-described lean mechanism is disposed.

The steering rod 26 is rotatably attached to the rod attaching portion 25b. The longitudinal direction of the steering rod 26 is coincident with the vehicle width direction. The left end of the steering rod 26 is attached to the left front wheel 31L (more specifically, to a portion of the left front wheel 31L more frontward than the axle). The right end of the steering rod 26 is attached to the right front wheel 31R (more specifically, to a portion of the right front wheel 31R more frontward than the axle). A rotational steering force applied by the driver causes the rod attaching portion 25b to rotate about a predetermined rotation axis, so that the steering rod 26 moves left or right. As a result, the actual steering angle is changed. The actual steering angle is a direction of the left front wheel 31L and the right front wheel 31R (more specifically, a rotation angle about a substantially upper-lower direction). This is how the advancing direction of the leaning vehicle 1 can be changed in accordance with the driver's manipulation.

Figure 4:
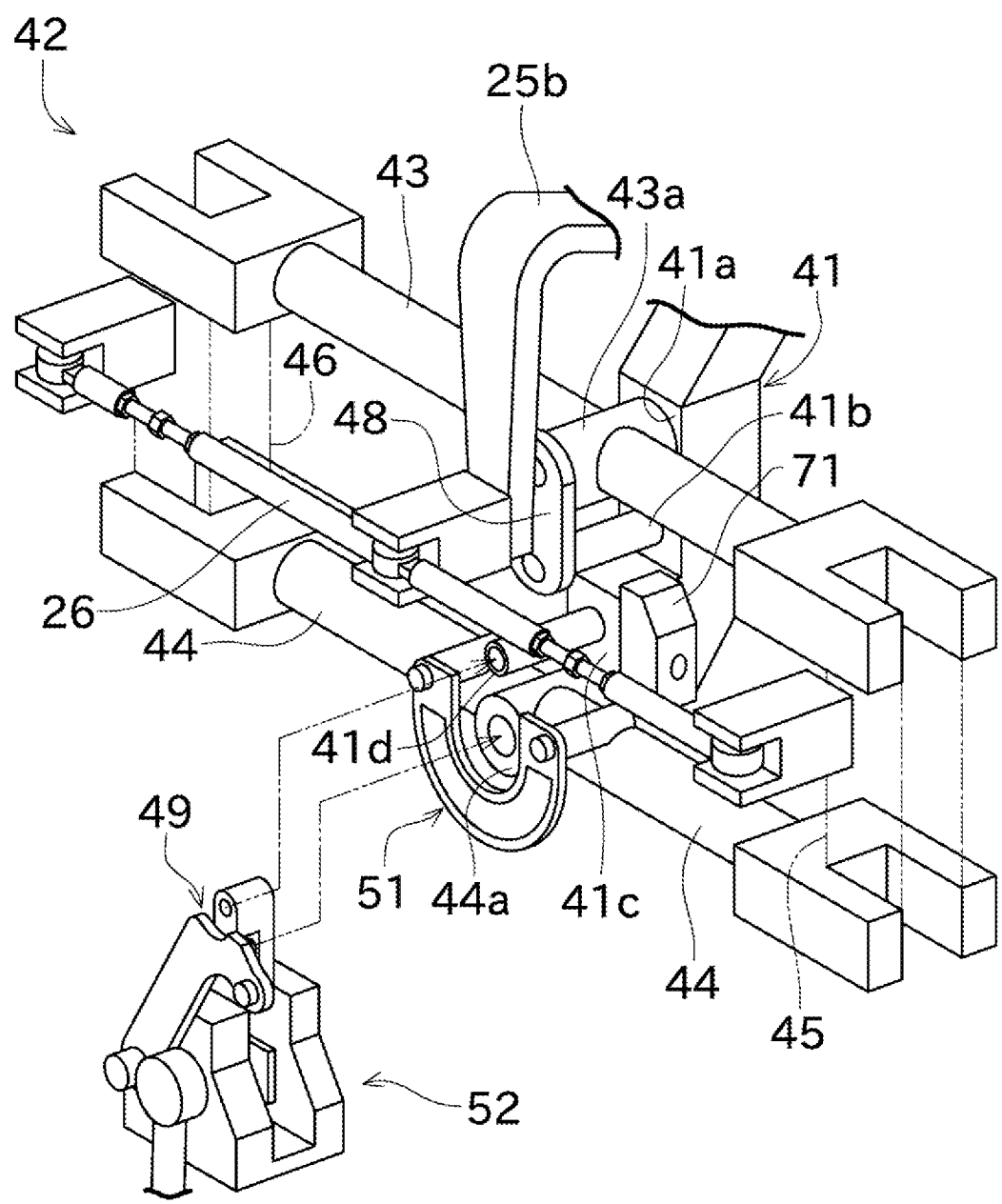
FIG. 4 shows a perspective view of a lean mechanism.
Figure 5:
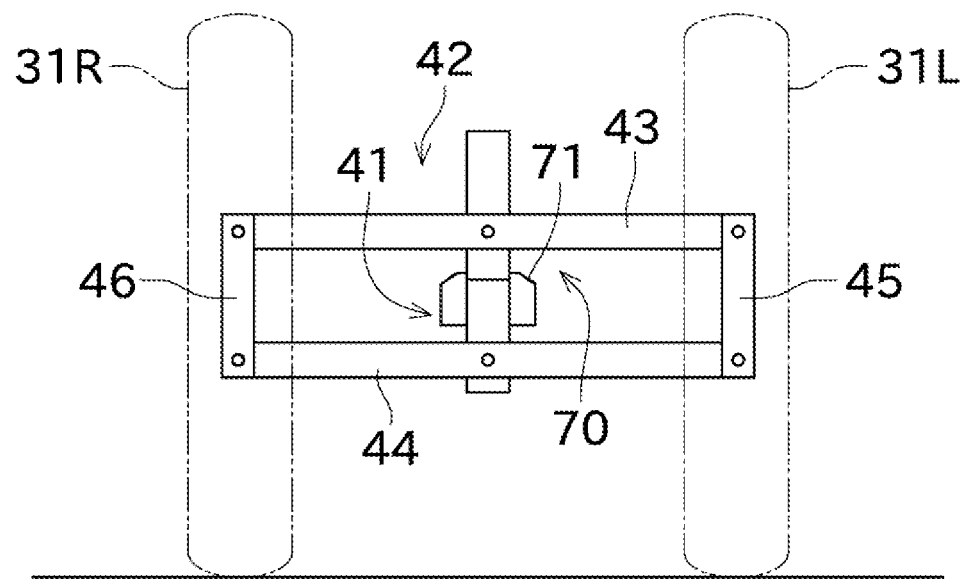
FIG. 5 shows a schematic front view illustrating a lean stopper mechanism.
Figure 5:
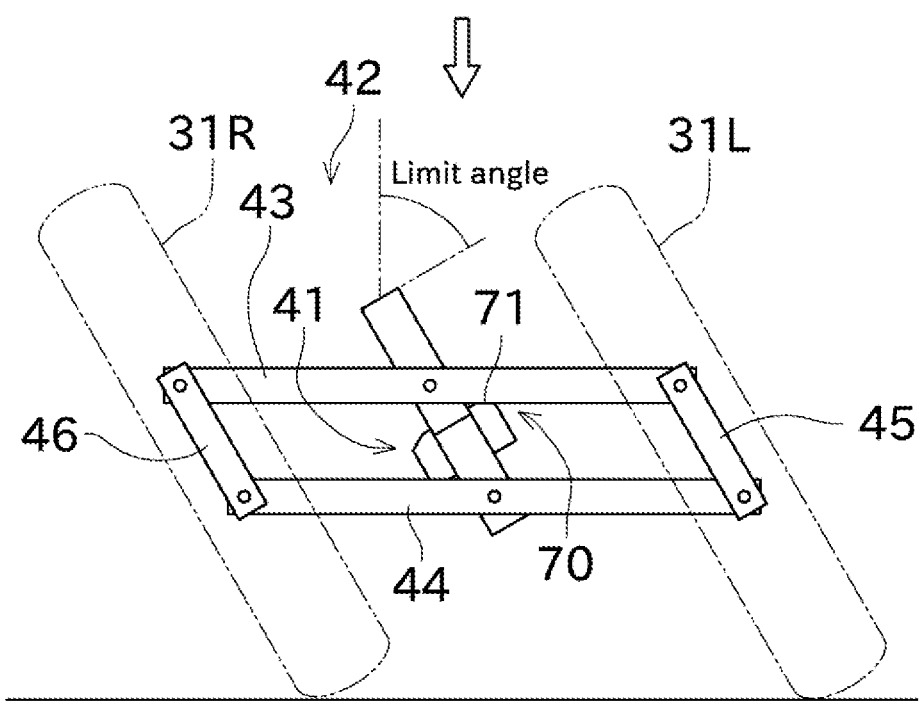

A lean mechanism 42 will now be described with reference to FIG. 4 and FIG. 5.

In the description of the lean mechanism 42, being rotatably attached means being attached so as to be capable of relative rotation about the front-rear direction.

Attached to a rear portion of the lower coupling base 16 is a lean base 41 extending downward from the lower coupling base 16. The lean base 41 is a member for supporting the lean mechanism 42 and also for coupling the lean mechanism 42 to the vehicle body 2 side (vehicle body frame 3 side). The lean base 41 is positioned so as to overlap the center in the vehicle width direction.

The lean base 41 and the lean mechanism 42, which are attached to the lower coupling base 16, are "vibration side members". The lean base 41 and the lean mechanism 42 are arranged at a relatively low position (a position where they are partially or entirely overlap the left front wheel 31L in a side view). With this, heavy parts can be arranged at a low position, and therefore the leaning vehicle 1 can be stabilized.

The lean base 41 includes an upper attaching portion 41a and a lower attaching portion 41c. The upper attaching portion 41a and the lower attaching portion 41c are formed on surfaces on the front side (one side in the front-rear direction, hereinafter the same). The upper attaching portion 41a is disposed more upward and more rearward than the lower attaching portion 41c. The upper attaching portion 41a has an upper protruding tube 41b protruding frontward. The lower attaching portion 41c has a lower protruding tube 41d protruding frontward. Here, it should be noted that the lean base 41 may have a configuration other than the first embodiment, as illustrated in a second embodiment which will be described later.

The lean mechanism 42 includes an upper arm 43, a lower arm 44, a left arm (first arm) 45, and a right arm (second arm) 46. The upper arm 43 is disposed more upward than the lower arm 44. The left arm 45 is rotatably coupled to the left end of the upper arm 43 and to the left end of the lower arm 44. The right arm 46 is rotatably coupled to the right end of the upper arm 43 and to the right end of the lower arm 44. The lean mechanism 42 is positioned so as to overlap the center in the vehicle width direction, and the left arm 45 and the right arm 46 are bilaterally symmetrical with respect to the center in the vehicle width direction.

The left end of the upper arm 43 has a bifurcated attaching portion. The upper arm 43 is attached to the left arm 45 in such a manner that the bifurcated attaching portion pinches an upper portion of the left arm 45 in the front-rear direction. This allows the left front wheel 31L to lean appropriately. The right end of the upper arm 43, and the left and right ends of the lower arm 44 also have bifurcated attaching portions in the same manner.

The upper arm 43 has, at its longitudinal center, an upper fulcrum portion 43a. The upper fulcrum portion 43a is a tubular portion whose axial direction is coincident with the front-rear direction. The upper fulcrum portion 43a is rotatably attached to the upper attaching portion 41a. The upper fulcrum portion 43a has the front end to which a coupling link 48 is rotatably attached. The coupling link 48 is rotatably attached not only to the front end of the upper fulcrum portion 43a but also to the front end of the upper protruding tube 41b. As a result, the upper arm 43 can be supported in a manner of being sandwiched between the lean base 41 and the coupling link 48 in the front-rear direction, so that the upper arm 43 can be supported more stably as compared to cantilevered supporting. The upper protruding tube 41b and the coupling link 48 may be omitted.

The lower arm 44 is attached in the same manner as the upper arm 43 is. To be specific, the lower arm 44 has, at its longitudinal center, a lower fulcrum portion 44a. The lower fulcrum portion 44a is a tubular portion whose axial direction is coincident with the front-rear direction. The lower fulcrum portion 44a is rotatably attached to the lower attaching portion 41c. The lower fulcrum portion 44a has the front end to which a lean bracket 49 is rotatably attached. The lean bracket 49 is rotatably attached not only to the front end of the lower fulcrum portion 44a but also to the front end of the lower protruding tube 41d. As a result, the lower arm 44 can be supported in a manner of being sandwiched between the lean base 41 and the lean bracket 49 in the front-rear direction, so that the lower arm 44 can be supported more stably as compared to cantilevered supporting.

The lean bracket 49 of this embodiment has a function for attaching not only the lower arm 44 but also another mechanism involved in leaning (e.g., a part of a lean brake mechanism 50) to the lean base 41. The lean brake mechanism 50 is a mechanism for braking a leaning operation. The lean brake means generating a resistance force on the leaning operation to make the leaning operation less likely to occur or to reduce the lean angle. The lean bracket 49 may be a member (a member like the coupling link 48) for attaching the lower arm 44 alone.

Both the upper protruding tube 41b and the lower protruding tube 41d are positioned more downward than the upper arm 43 and more upward than the lower arm 44. This allows the lean mechanism 42 to have a reduced size in the upper-lower direction as compared to a configuration having the upper protruding tube 41b disposed more upward than the upper attaching portion 41a, for example.

The left arm 45 is rotatably attached to the left wheel 32L. To be specific, the left arm 45 is attached to the hub 32a of the left wheel 32L. The left arm 45 is fixed to the left wheel 32L such that the left arm 45 leans integrally with the left wheel 32L. Likewise, the right arm 46 is fixed to the hub 32a of the right wheel 32R.

The four arms constitute a parallel link. Accordingly, even in the leaning operation, the upper arm 43 and the lower arm 44 are kept parallel as shown in FIG. 5. The upper arm 43 rotates about the upper fulcrum portion 43a relative to the lean base 41. Likewise, the lower arm 44 rotates about the lower fulcrum portion 44a relative to the lean base 41. This is how the lean mechanism 42 rotates relative to the lean base 41.

Since the four arms constitute the parallel link, the left arm 45 and the right arm 46 are kept parallel even in the leaning operation. It therefore is possible that the left front wheel 31L and the right front wheel 31R lean with the same lean angle. The lean angle means the angle formed between a vehicle height direction of the leaning vehicle 1 and a direction perpendicular to the road surface.

The lean base 41 couples the longitudinal center (upper fulcrum portion 43a) of the upper arm 43 to the longitudinal center (lower fulcrum portion 44a) of the lower arm 44. Accordingly, the lean base 41 leans with the same lean angle as the left front wheel 31L and the right front wheel 31R do. In other words, the vehicle body 2 leans with the same lean angle as the left front wheel 31L and the right front wheel 31R do. The rear wheel 9 leans integrally with the vehicle body 2. In this manner, the leaning vehicle 1 is configured to be capable of leaning.

The lean brake mechanism 50 is a mechanism for braking a leaning operation. The lean brake mechanism 50 includes a brake disc 51 and a brake caliper 52. The brake disc 51 is attached to the lower arm 44 and rotates integrally with the lower arm 44 about the lower fulcrum portion 44a of the lower arm 44. The brake caliper 52 is attached to the lean base 42 and rotates integrally with the lean base 42.

Thus, the brake disc 51 and the brake caliper 52 rotate relative to each other during the leaning operation. The brake caliper 52 includes a brake pad. The brake caliper 52 can press the brake pad against the brake disc 51 in response to operation of the driver or a command of a control device. Thus, the lean brake is actuated by pressing the brake pad against the brake disc 51 during the leaning operation.

A lean stopper mechanism 70 and its layout will now be described with reference to FIG. 4 and FIG. 5.

The lean stopper mechanism 70 has a configuration for setting an upper limit of the lean angle (hereinafter, limit angle) by having members whose relative positions change during the leaning operation contact each other. Though a driver who is not used to drive the leaning vehicle 1 may feel psychological resistance to lean the leaning vehicle 1, the psychological resistance can be reduced because of the limit angle.

The lean stopper mechanism 70 of this embodiment consists of a stoppers 71 and the upper arm 43.

The stoppers 71 are attached to the lean base 42. Specifically, the stoppers 71 are attached to a surface facing the vehicle width direction (both of a left surface and a right surface) of the lower attaching portion 41c of the lean base 41 with a fixture. The two stoppers 71 are bilaterally symmetrical with respect to the center in the vehicle width direction. An attaching direction of the stoppers 71 is parallel to the vehicle width direction. The attaching direction is an axial direction of the fixture for attaching or a normal line direction of contact surfaces of members attached each other. The stoppers 71 are attached to the lean base 42 so that the stoppers 71 cannot rotate relative to the lean base 42.

As described above, the lean base 42 and the upper arm 43 rotate relative to each other about the upper fulcrum portion 43a during the leaning operation. Therefore, as the lean angle increases, the distance between the upper arm 43 and the stoppers 71 becomes closer, and at the timing when the above described limit angle is reached, the upper arm 43 and the stoppers 71 come into contact. This prevents the lean angle from exceeding the limit angle.

The stoppers 71 may be a dedicated member that only has the function of preventing the lean angle from going above the limit angle, or another member may have the function of the stopper.

The stoppers 71 of this embodiment is rectangular-shape and is chamfered at a point where it contacts the upper arm 43. Therefore, the upper arm 43 can be prevented from colliding with the corners of the rectangular body, and the reaction force received by the upper arm 43 when the lean angle reaches the limit angle can be distributed.

The direction of the collision of the upper arm 43 and the stoppers 71 is parallel to the upper-lower direction. The direction of the collision is a normal line direction of contact surfaces when the surfaces are contacting. The attaching direction of the stoppers 71 is parallel to the vehicle width direction. Thus, the attaching direction of the stoppers 71 and the direction of the collision of the upper arm 43 and the stoppers 71 are perpendicular (including substantially perpendicular, hereinafter the same). Therefore, the fixation of the stoppers 71 is less easily to loosen by the collision of the upper arm 43.

The stoppers 71 are removably attached to the lean base 42. Thus, even if the stopper 71 is damaged, only the stopper 71 can be replaced. A distance from the stopper 71 to the upper arm 43 (a length along the direction of the relative rotation) can be changed by replacing the stopper 71 with other stopper 71 in which the shape is different. Therefore, the limit angle can be changed by replacing the stoppers 71.

Alternatively, the stoppers 71 may have a mechanism for adjusting the distance to the upper arm 43. Therefore, the limit angle can be changed without replacing the stoppers 71. The moves for adjusting the distance may be a mechanism of moving in the axial direction by rotating a bolt or the like.

In this embodiment, the position in the front-rear direction of the upper arm 43 and the lower arm 44 do not coincident, and the lower arm 44 is positioned forward than the upper arm 43. Thus, there is a space lower of the upper arm 43. The stoppers 71 are positioned in the space. In this manner, in this embodiment, the lean stopper mechanism 70 can be disposed with effective use of the position in the front-rear direction of the upper arm 43 and the lower arm 44.

In this embodiment, the steering rod 26 and the lean brake mechanism 50 are positioned forward than the lower arm 44. Thus, there is a space rearward of the lower arm 44. The stoppers 71 are positioned in the space. In this manner, in this embodiment, the lean stopper mechanism 70 can be disposed with effective use of the position of the steering rod 26 and the lean brake mechanism 50.

The stoppers 71 are positioned between the upper arm 43 and the lower arm 44 in the front view. Accordingly, since a space around the lean mechanism 42 can be exist, other parts can be disposed in the space.

The limit angle realized by the lean stopper mechanism 70 will now be described with reference to FIG. 6.

First, conditions for self-standing of the leaning vehicle 1 will be described. In the plan view, contact positions of a plurality of the wheels (specifically, tires) and the road surface connected by line segments. The space bounded by these line segments is referred to as a grounding surface inner area 100. since the leaning vehicle 1 of this embodiment is three-wheels vehicle, the grounding surface inner area 100 is triangular. If the gravity center of the leaning vehicle 1 in the plan view is positioned in the grounding surface inner area 100 and the vehicle speed of the leaning vehicle 1 is zero, the leaning vehicle 1 is self-standing.

Figure 6:
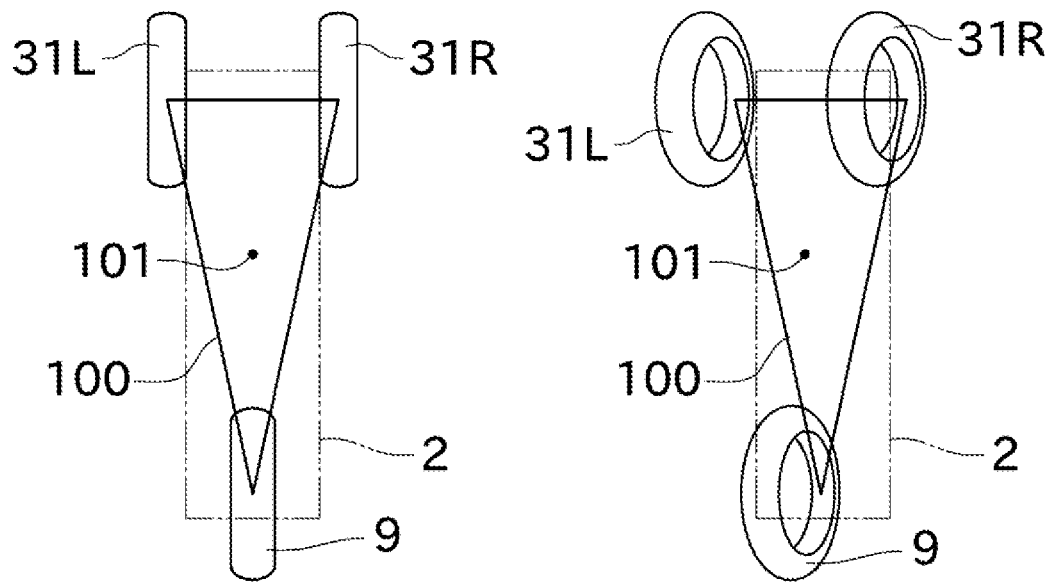
FIG. 6 shows a view illustrating positional relationship of a gravity center and a grounding surface area.
Figure 6:
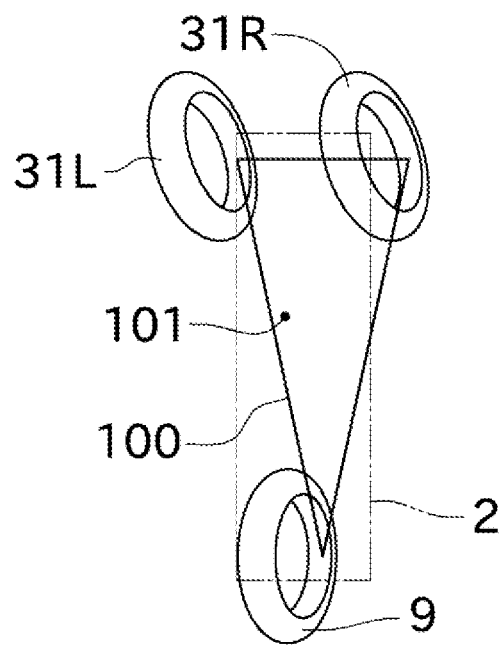

FIG. 6 shows the position of the gravity center (vehicle gravity center) of the leaning vehicle 1 in the plan view. The gravity center 101 overlaps heavy parts such as the engine 5 in the plan view. The gravity center 101 is a gravity center in a situation where no weight other than own weight is applied to the lean vehicle 1 (i.e., the leaning vehicle 1 does not support the driver and luggage, etc.). Since a driver is generally seated near a gravity center, the gravity center including the driver is positioned near the gravity center excluding the driver. Therefore, if the gravity center excluding the driver is used to determine whether the leaning vehicle is self-standing, it is still useful as a result of determining the self-standing in a situation the driver is seated.

FIG. 6 shows the grounding surface inner area 100 and the gravity center 101 of the leaning vehicle 1 in conditions A, B, C.

In the condition A, the lean angle of the leaning vehicle 1 is 0 degree (that is, the leaning vehicle 1 is upright) and the actual steering angle is 0 degree. In the condition A, the gravity center 101 is positioned so as to overlap the center in the vehicle width direction. In the condition A, the gravity center 101 is positioned in the grounding surface inner area 101. Therefore, the leaning vehicle 1 in the condition A is self-standing.

In the condition B, the lean angle of the leaning vehicle 1 is the limit angle and the actual steering angle is 0 degree. As the lean angle increases, the gravity center 101 moves outward in the vehicle width direction (first direction, to the left in the figure). Therefore, the leaning vehicle 1 is less easily to be self-standing. Since the contact position of the wheels moves outward in the vehicle width direction, the size of the grounding surface inner area 100 slightly changes.

In this embodiment, in the condition B, the gravity center 101 is also positioned in the grounding surface inner area 101. Thus, the leaning vehicle 1 is self-standing in a situation where the lean angle coincident with the limit angle. Accordingly, the leaning vehicle 1 remains the self-standing state during the leaning operation or the like. Thus, if the vehicle speed of the leaning vehicle 1 slows down during the leaning operation, the leaning vehicle 1 is self-standing. Accordingly, the attitude of the leaning vehicle 1 can stabilized and the psychological resistance of the driver of the leaning operation can be reduced.

In the condition C, the lean angle of the leaning vehicle 1 is the limit angle and the actual steering angle is maximum degrees. As the actual steering angle increases, the contact position between the left front wheel 31L and the road surface and the contact position between the right front wheel 31R and the road surface change. Thus, the grounding surface inner area 100 is small. Therefore, the leaning vehicle 1 is less easily to be self-standing. The maximum angle will now be described. When the steering handle 7 is rotated, the steering handle 7 or a member that rotates integrally with it contacts another member, preventing the steering handle 7 from rotating any further. The actual steering angles of the left front wheel 31L and the right front wheel 31R in this state are the "maximum angle of the actual steering angle".

In this embodiment, in the condition C, the gravity center 101 is also positioned in the grounding surface inner area 101. Thus, the leaning vehicle 1 is self-standing in a situation where the lean angle coincident with the limit angle and the actual steering angle coincident with the maximum angle. In this manner, since the leaning vehicle 1 of this embodiment is very difficult to fall down, the psychological resistance of the driver of the leaning operation can be greatly reduced.

Figure 7:
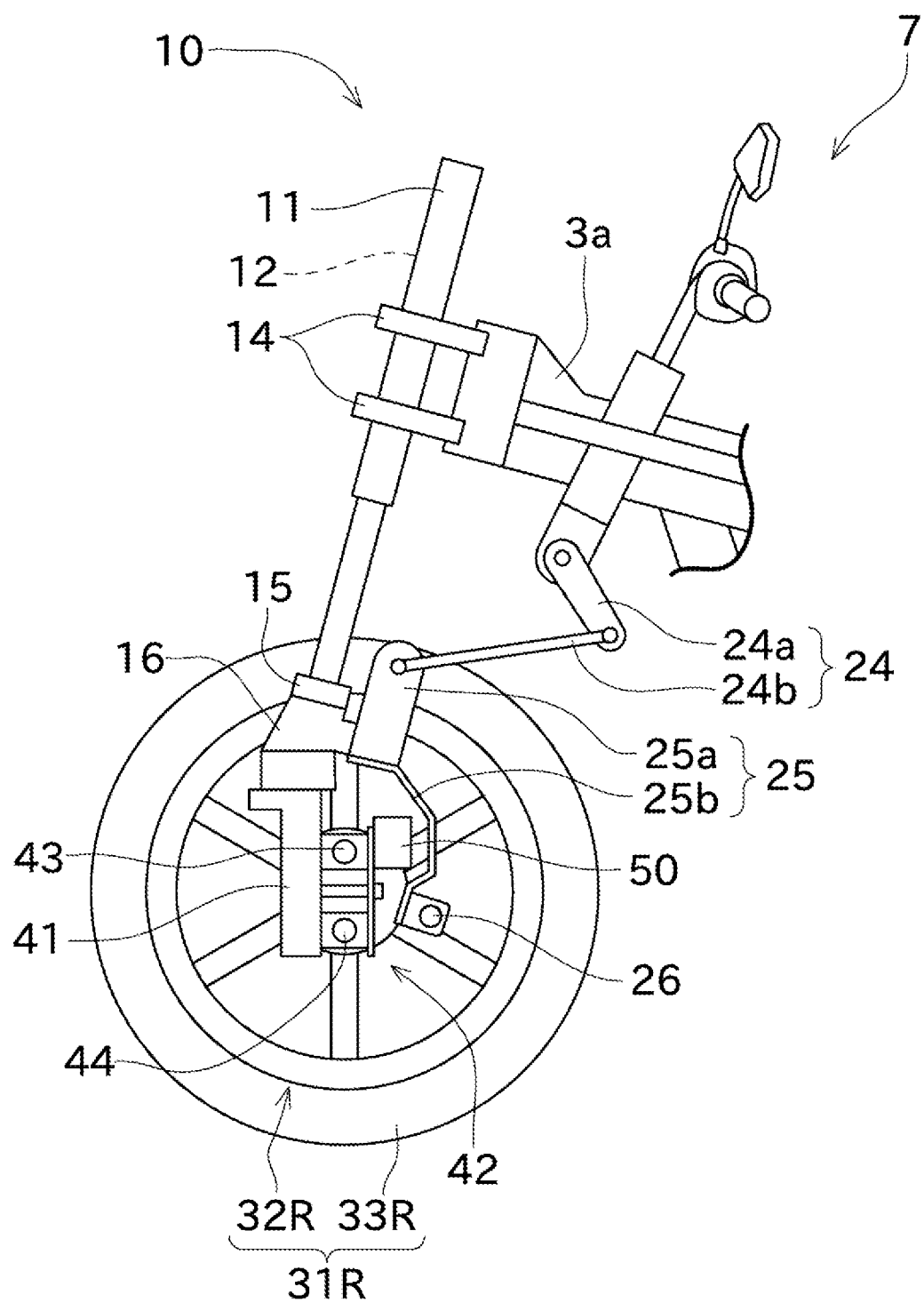
FIG. 7 shows a side view of a front portion of a leaning vehicle according to a second embodiment.

A leaning vehicle 1 according to the second embodiment will now be described with reference to FIG. 7 to FIG. 9.

The description of the second embodiment will mainly deal with configurations different from the first embodiment. In the description of the second embodiment, members identical or similar to those of the first embodiment are given the same reference signs on the drawings, and their descriptions may be omitted or simplified.

The suspension 10 of the first embodiment includes the three tubular suspensions 11, 12, and 13. A suspension 10 of the second embodiment, on the other hand, includes two tubular suspensions 11 and 12. The first tubular suspension 11 and the second tubular suspension 12 are disposed side by side in the vehicle width direction.

In the first embodiment, the rotational steering force of the steering handle 7 is transmitted to the pantograph mechanism 24 via the first steering part 23. In the second embodiment, on the other hand, a rotational steering force of a steering handle 7 is directly transmitted to a pantograph mechanism 24. Thus, the pantograph mechanism 24 is attached to a member that rotates coaxially with the steering handle 7.

In the second embodiment, a lower coupling base 16 does not cross a second steering part 25, and a lean base 41 is positioned immediately below the lower coupling base 16. An upper arm 43 and a lower arm 44 are positioned more rearward than the lean base 41. With this, a steering rod 26 and a lean brake mechanism 50 are also positioned more rearward than the lean base 41. In this manner, arranging members involved in leaning and steering on one side (on the front side in the first embodiment, and on the rear side in the second embodiment) of the lean base 41 allows the members involved in leaning and steering to be arranged collectively.

Figure 8:
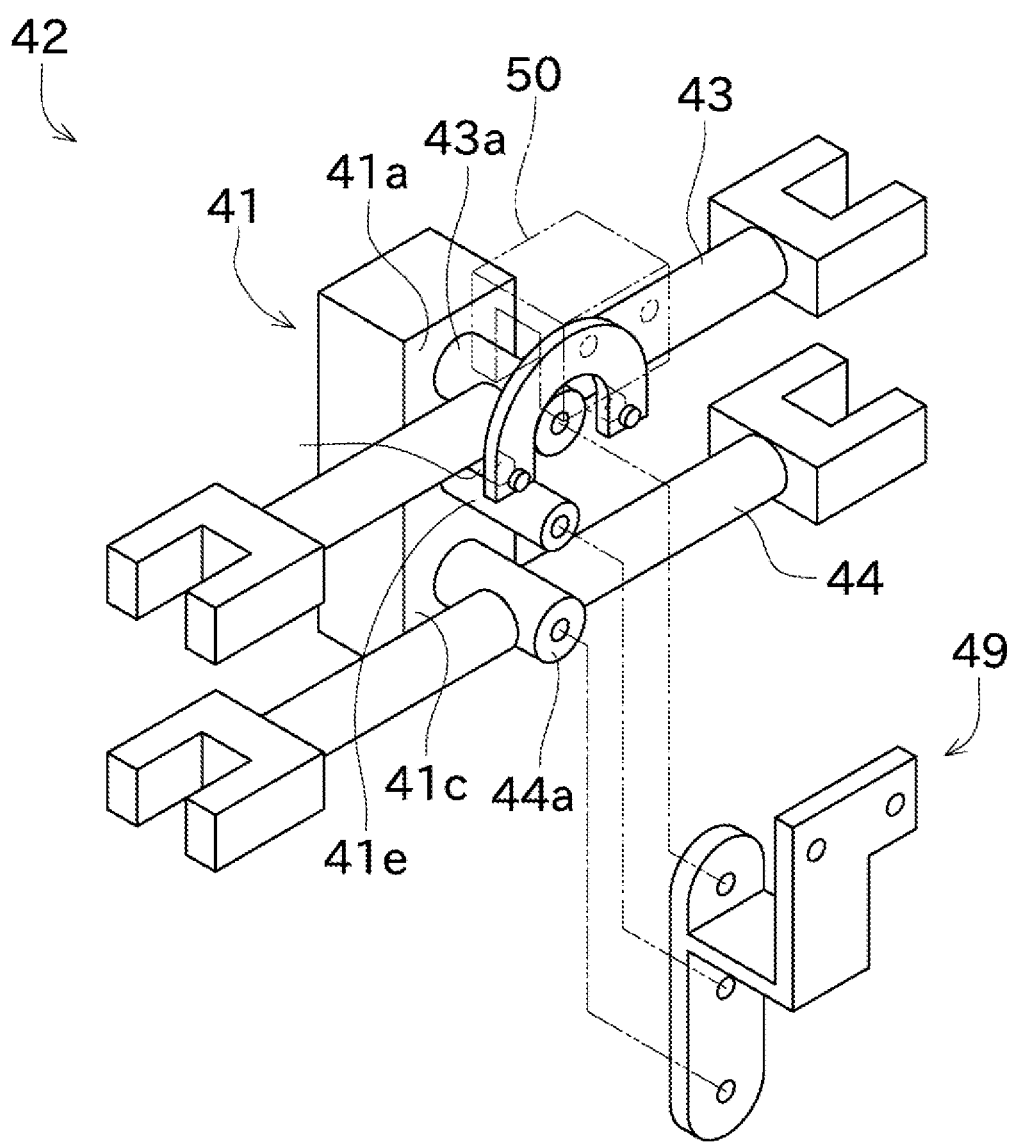
FIG. 8 shows a perspective view of a lean mechanism according to the second embodiment.

As shown in FIG. 8, a structure for attaching the upper arm 43 and the lower arm 44 is also different from that of the first embodiment. In the first embodiment, the upper attaching portion 41a and the lower attaching portion 41c of the lean base 41 are at different positions in the front-rear direction. In the second embodiment, an upper attaching portion 41a and a lower attaching portion 41c are at the same position in the front-rear direction. Accordingly, the upper arm 43 and the lower arm 44 are at the same position in the front-rear direction.

Although in the first embodiment, the lean base 41 has the upper protruding tube 41b and the lower protruding tube 41d, both of their functions is provided by a middle protruding tube 41e in the second embodiment. Thus, a lean bracket 49 attaches an upper fulcrum portion 43a, the middle protruding tube 41e, a lower fulcrum portion 44a, and the lean brake mechanism 50 collectively to the lean base 41.

Figure 9:
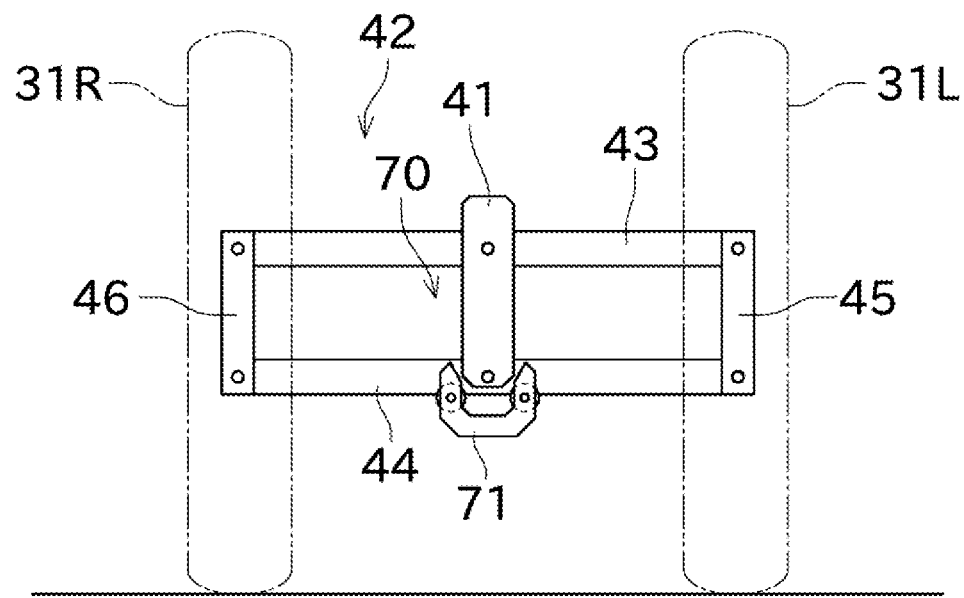
FIG. 9 shows a schematic front view illustrating a lean stopper mechanism of second embodiment.
Figure 9:
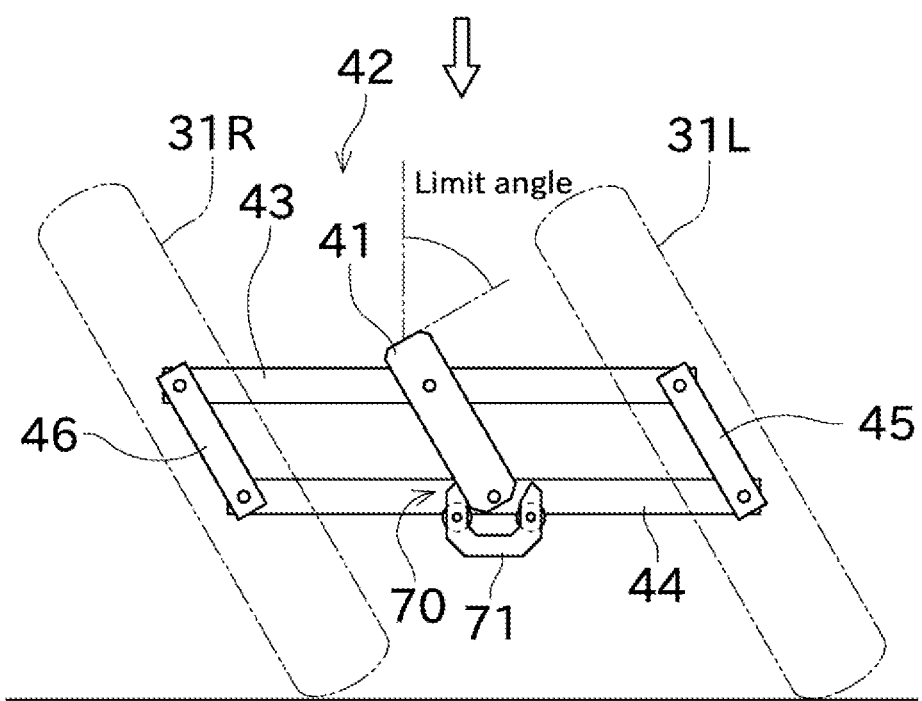

As shown in FIG. 9, the stopper 71 is attached to the lower arm 44. The stopper 71 is fixed to the lower arm 44 at two points and rotates integrally with the lower arm 44. The stopper 71 is attached to the position overlaps the lean base 42 in the plan view. As described above, the lean base 42 and the lower arm 44 rotate relative to each other during the leaning operation. The lean base 41 and the stopper 71 make contact at the timing when the lean angle reaches the limit angle. This prevents the lean angle from exceeding the limit angle.

In the second embodiment, the stopper 71 is U-shaped and disposed so as to surround the lean base 41 in the front view. This configuration allows the stopper 71 to function as a stopper for any left or right leaning operation with a single member.

Figure 10:
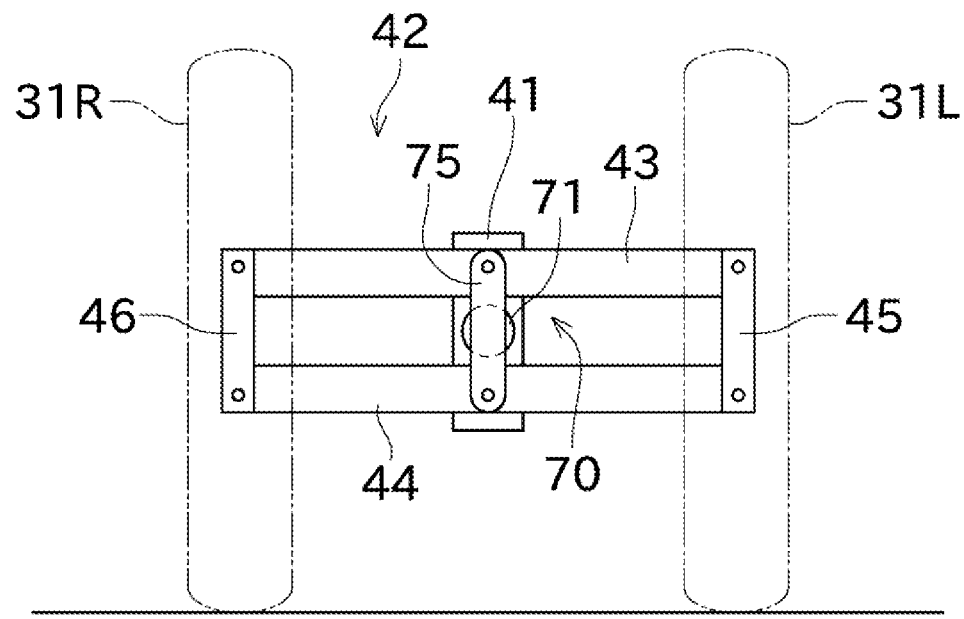
FIG. 10 shows a schematic front view illustrating a lean stopper mechanism of third embodiment.
Figure 10:
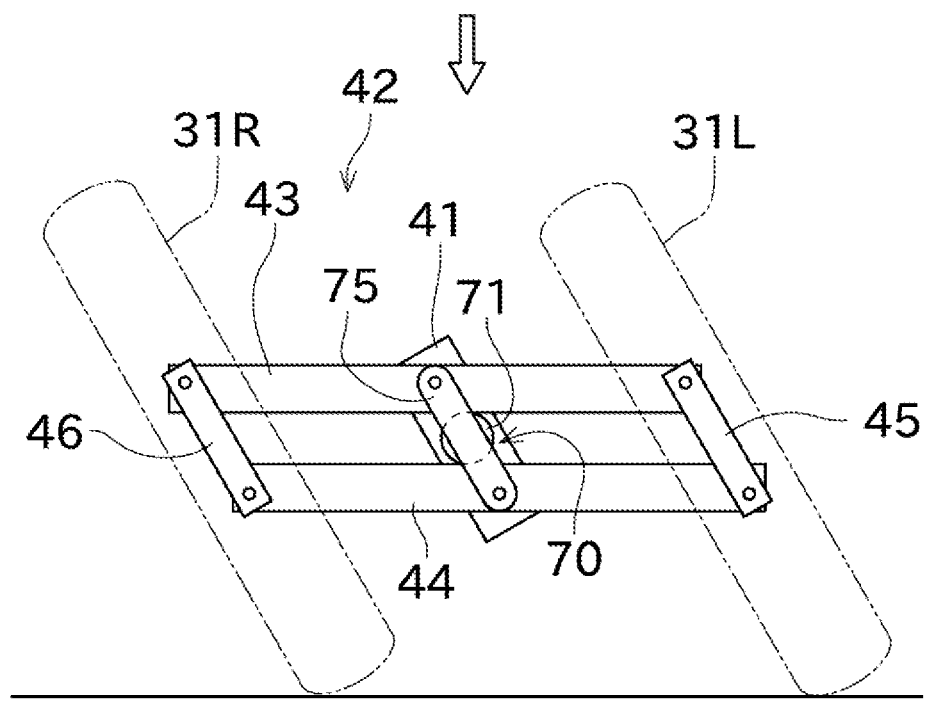

A leaning vehicle 1 according to the third embodiment will now be described with reference to FIG. 10.

The lean mechanism 42 of the third embodiment further includes a second base 75. The second base 75 is positioned so as to facing the lean base 42 each other in the front-rear direction. The upper arm 43 and the lower arm 44 are attached to the second base 75 that is same as the lean base 41. In the third embodiment, the stopper 71 is disposed so as to connects the lean base 41 and the second base 75. The stopper 71 is disposed a center of the upper arm 43 and the lower arm 44 in the upper-lower direction while the leaning vehicle 1 is upright.

Since the upper arm 43 and the lower arm 44 becomes closer during the leaning operation, the upper arm 43 and the lower arm 44 are closer to the stopper 71. The upper arm 43 and the lower arm 44 contact the stopper 71 at the timing when the lean angle reaches the limit angle. This prevents the lean angle from exceeding the limit angle.

Figure 11:
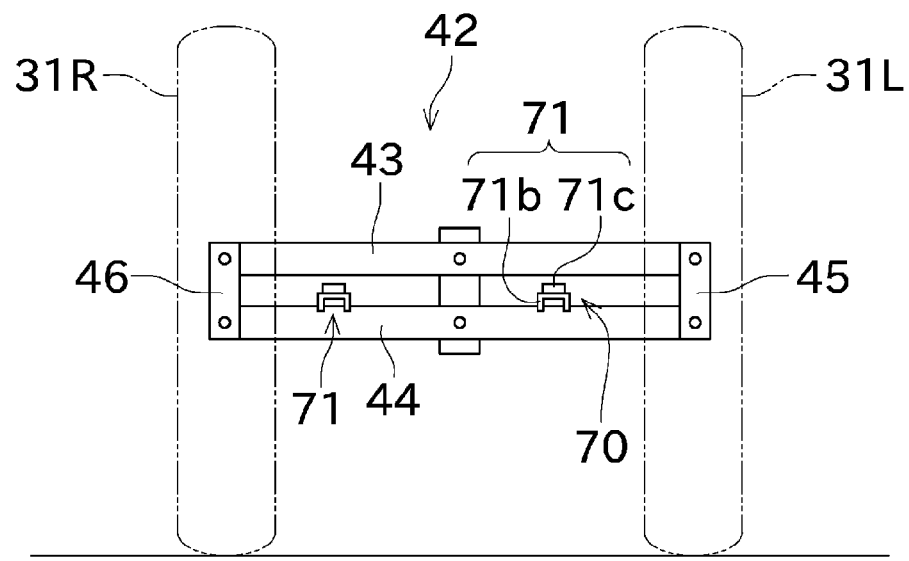
FIG. 11 shows a schematic front view illustrating a lean stopper mechanism of fourth embodiment.
Figure 11:
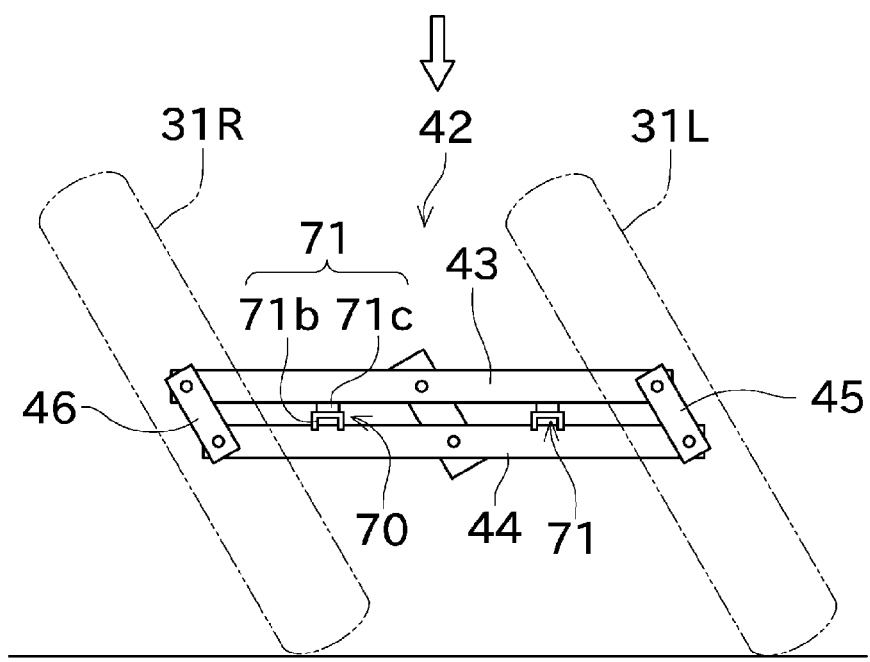

A leaning vehicle 1 according to the fourth embodiment will now be described with reference to FIG. 11.

The stoppers 71 are attached between the upper arm 43 and the lower arm 44. Specifically, the stoppers 71 are upper surface of the lower arm 44. The stopper 71 includes a base 71b and a buffer 71c. The buffer 71c is an elastic material such as rubber or a soft resin, which cushions the impact of a collision.

As described above, since the upper arm 43 and the lower arm 44 becomes closer during the leaning operation, the upper arm 43 and the lower arm 44 are closer to the stopper 71. The upper arm 43 and the lower arm 44 contact the stopper 71 (buffer 71c) at the timing when the lean angle reaches the limit angle. This prevents the lean angle from exceeding the limit angle.

In this manner, the stoppers 71 can be attached to any parts in which the relative positions approach each other as a result of the leaning operation. The configuration of having the buffer 71c is applied to not only the fourth embodiment, but also the first to third embodiment.

As thus far described, the leaning vehicle 1 according to any of the foregoing embodiments includes the vehicle body 2, a plurality of wheels, the lean mechanism 42, and the lean stopper mechanism 70. The wheels include the left front wheel 31L and the right front wheel 31R. The lean mechanism 42 causes the left front wheel 31L and the right front wheel 31R to lean about the front-rear direction as a rotation center when the vehicle body 2 leans about the front-rear direction as a rotation center. The lean stopper mechanism 70 includes the stopper 71 moving in response to the leaning operation by the lean mechanism 42 and prevents the lean angle from exceeding the limit angle by bringing the stopper 71 into contact with other member when the lean angle reaches the limit angle. In a plan view, the area bounded by lines connecting contact positions of ground and tires of the plurality of wheels is referred to as the grounding surface inner area 100, and the gravity center 101 is positioned in the grounding surface inner area 100 in a state where the lean angle reaches the limit angle.

Accordingly, since the leaning vehicle remains the self-standing in the limit angle, the leaning vehicle is less likely to fall down. Moreover, the psychological resistance of leaning the leaning vehicle for the driver who is not used to drive a leaning vehicle can be reduced.

In the leaning vehicle 1 according to any of the foregoing embodiments, in the plan view, the gravity center 101 is positioned in the grounding surface inner area 100 in a state where the lean angle reaches the limit angle of the first direction and the actual steering angle of the left front wheel 31L and the right front wheel 31R are neutral.

With this, the leaning vehicle 1 can be stabilized during low-speed traveling, for example.

In the leaning vehicle 1 according to any of the foregoing embodiments, in the plan view, the gravity center 101 is positioned in the grounding surface inner area 100 in a state where the lean angle reaches the limit angle of the first direction and the actual steering angle of the left front wheel 31L and the right front wheel 31R are maximum angle in the first direction.

When the actual steering angle is changed, the gravity center 101 easily deviates from the grounding surface inner area 100 because the contact position of the tire changes, however, when the actual steering angle is increased to the limit, the gravity center 101 remains in the grounding surface inner area 100, making it more difficult for the leaning vehicle 1 to fall down.

The leaning vehicle 1 according to any of the foregoing embodiments includes a rear wheel 9 that is single in addition to the left front wheel 31L and the right front wheel 31R.

This allows for a three-wheeled leaning vehicle 1 that is less likely to fall down.

The leaning vehicle 1 according to any of the foregoing embodiments includes the lean base 41 for connecting the lean mechanism 42 to vehicle body 2. The lean mechanism 42 includes the upper arm 43, the lower arm 44, the left arm 45, and the right arm 46. The lower arm 44 is positioned more downward than the upper arm 43. The left arm 45 is attached to the left front wheel 31L, and is rotatably attached to the upper arm 43 and the lower arm 44. The right arm 46 is attached to the right front wheel 31R, and is rotatably attached to the upper arm 43 and the lower arm 44. The lean stopper mechanism 70 prevents the lean angle from exceeding the limit angle by bringing the stopper 71 disposed at the lean base 41 into contact with the upper arm 43 or the lower arm 44, or by bringing the stopper 71 disposed at the upper arm 43 or the lower arm 44 into contact with the lean base 41.

Accordingly, the lean stopper mechanism 70 can be realized by using the movement of the upper arm 43 or the lower arm 44 of the lean mechanism 42.

In the leaning vehicle 1 according to any of the foregoing embodiments, the axial direction of the fixture for attaching the stopper 71 and the direction of bringing the upper arm 43, the lower arm 44, and the lean base 41 into contact with the stopper 71 are perpendicular.

Accordingly, since the direction of force of being applying to the stopper 71 and the axial direction of the fixture are perpendicular, fixation of the stopper 71 is less likely to loosen.

The leaning vehicle 1 according to any of the foregoing embodiment includes the lean brake mechanism 50 that brakes the leaning operation by braking a movement of the lean mechanism 42 generated along with the leaning operation. The lean brake mechanism 50 brakes the movement of one arm of the upper arm 43 or the lower arm 44. The lean stopper mechanism 70 prevents the lean angle from exceeding the limit angle by using the other arm of the upper arm 43 and the lower arm 44.

Accordingly, the lean brake mechanism 50 and the lean stopper mechanism 70 can be efficiently disposed.

In the leaning vehicle 1 according to any of the foregoing embodiments, the stopper 71 is removable or a position of the stopper 71 is changeable.

Accordingly, the limit angle of the lean angle can be adjusted.

In the leaning vehicle 1 according to any of the foregoing embodiments, the buffer 71c for cushioning shock is attached to the stopper 71.

This reduces the impact when the stopper 71 is actuated.

While some preferred embodiments of the present invention have been described above, the configurations described above may be modified, for example, as follows.

Features of the first and second embodiments described above may be combined in appropriate manners. For example, the number of tubular suspensions, the lean mechanism 42, or the like, illustrated in the second embodiment may be applicable to the first embodiment. The same is true for other features.

In the various mechanisms described above, the shape of a component, the layout of a component, the structure for attaching a component, the structure for transmitting power, and the like, are just examples, and other configurations may be adoptable. For example, the left arm 45 does not always need to serve as a component for transmitting a steering force. A component different from the left arm 45 may serve as the component for transmitting a steering force.

Although the foregoing embodiments illustrate an example in which the present invention is applied to the leaning vehicle 1 having two front wheels and one rear wheel, the number of wheels is not limited to this. Two rear wheels may be acceptable. In addition, the number of persons who can ride on the leaning vehicle 1 is not limited to one or two. Three or more persons may ride.

REFERENCE SIGNS LIST 1 leaning vehicle
2 vehicle body
7 steering handle
10 suspension
23 first steering part 24 pantograph mechanism
25 second steering part
31L left front wheel (first front wheel)
31R right front wheel (second front wheel)
32L left wheel
32R right wheel
42 lean mechanism
50 lean brake mechanism
70 lean stopper mechanism
71 stopper

The invention claimed is:

1. A leaning vehicle, comprising:
a vehicle body;
a plurality of wheels including a first front wheel and a second front wheel;
a lean mechanism configured to cause the first front wheel and the second front wheel to lean about a front-rear direction as a rotation center when the vehicle body leans about the front-rear direction as the rotation center;
a lean stopper mechanism including a stopper moving in response to a leaning operation by the lean mechanism and prevents a lean angle from exceeding a limit angle by bringing the stopper into contact with other member when the lean angle reaches the limit angle; and
a steering rod configured to transmit steering force to the first front wheel and the second front wheel, the steering rod being positioned at a lower position than an upper end of the first and second front wheels,
wherein in a plan view, an area bounded by lines connecting contact positions of ground and tires of the plurality of wheels is referred to as a grounding surface inner area, and
wherein in the plan view, a vehicle gravity center is positioned in the grounding surface inner area in a state where the lean angle reaches the limit angle.

2. The leaning vehicle according to claim 1, wherein in the plan view, the vehicle gravity center is positioned in the grounding surface inner area in a state where the lean angle reaches the limit angle of a first direction in a vehicle width direction and an actual steering angle of the first front wheel and the second front wheel are neutral.

3. The leaning vehicle according to claim 1, wherein in the plan view, the vehicle gravity center is positioned in the grounding surface inner area in a state where the lean angle reaches the limit angle of a first direction in a vehicle width direction and an actual steering angle of the first front wheel and the second front wheel are a maximum angle in the first direction.

4. The leaning vehicle according to claim 1, further comprising:
a rear wheel which is single in addition to the first front wheel and the second front wheel.

5. The leaning vehicle according to claim 1, further comprising:
a lean base coupling the lean mechanism to the vehicle body,
wherein the lean mechanism including:
an upper arm;
a lower arm positioned more downward than the upper arm;
a first arm attached to the first front wheel and rotatably attached to the upper arm and the lower arm; and
a second arm attached to the second front wheel and rotatably attached to the upper arm and the lower arm, and
wherein the lean stopper mechanism prevents the lean angle from exceeding the limit angle by bringing the stopper disposed at the lean base into contact with the upper arm or the lower arm, or by bringing the stopper disposed at the upper arm or the lower arm into contact with the lean base.

6. The leaning vehicle according to claim 5, wherein an axial direction of a fixture for attaching the stopper and a direction of bringing the upper arm, the lower arm, and the lean base into contact with the stopper are perpendicular.

7. The leaning vehicle according to claim 5, further comprising:
a lean brake mechanism configured to brake the leaning operation by braking a movement of the lean mechanism generated along with the leaning operation,
wherein the lean brake mechanism brakes the movement of one arm of the upper arm or the lower arm, and
wherein the lean stopper mechanism prevents the lean angle from exceeding the limit angle by using the other arm of the upper arm and the lower arm.

8. The leaning vehicle according to claim 1, wherein the stopper is removable or a position of the stopper is changeable.

9. The leaning vehicle according to claim 1, wherein a buffer cushioning shock is attached to the stopper.

10. The leaning vehicle according to claim 1, wherein the lean mechanism includes an upper arm and a lower arm, the lower arm being positioned further downward than the upper arm, the lower arm being positioned further forward than the upper arm and wherein the lean stopper mechanism or the steering rod is positioned further rearward than the lower arm.

11. The leaning vehicle according to claim 1, wherein the lean mechanism includes an upper arm and a lower arm, the lower arm being positioned further downward than the upper arm and wherein the steering rod is positioned further forward than the lower arm.

12. The leaning vehicle according to claim 1, wherein the lean mechanism includes first and second arms, the first arm being attached to the first front wheel, the second arm being attached to the second front wheel and wherein each of the first and second arms is a part in which a knuckle member configured to change an actual steering angle and a member configured to lean the leaning vehicle.

13. The leaning vehicle according to claim 1, wherein the stopper includes a mechanism configured to adjust to the limit angle.

14. The leaning vehicle according to claim 1, wherein the stopper is removably attached to the vehicle body.

15. The leaning vehicle according to claim 1, further comprising:
a swing arm; and
a drive source being arranged further forward than the swing arm.

16. The leaning vehicle according to claim 1, further comprising:
a seat; and
a drive source being arranged further forward than the seat,
wherein the lean mechanism includes an upper arm and a lower arm, the lower arm being positioned further downward than the upper arm, the lower arm being positioned further forward than the upper arm and wherein the lean stopper mechanism or the steering rod is positioned further rearward than the lower arm.

17. A leaning vehicle, comprising:
a vehicle body;

a plurality of wheels including a first front wheel and a second front wheel;

a lean mechanism configured to cause the first front wheel and the second front wheel to lean about a front-rear direction as a rotation center when the vehicle body leans about the front-rear direction as the rotation center, the lean mechanism including upper and lower arms, the lower arm being positioned further downward than the upper arm, the lower arm being positioned further forward than the upper arm; and a lean stopper mechanism including a stopper moving in response to a leaning operation by the lean mechanism and prevents a lean angle from exceeding a limit angle by bringing the stopper into contact with other member when the lean angle reaches the limit angle, wherein in a plan view, an area bounded by lines connecting contact positions of ground and tires of the wheels is referred to as a grounding surface inner area, and in the plan view, and wherein the lean stopper mechanism is positioned further rearward than the lower arm.

18. The leaning vehicle according to claim 17 wherein the lean stopper mechanism including a mechanism configured to adjust the limit angle.

* * * * *